(No Model.)

C. W. & W. C. COLLYER.
SEWING MACHINE OR OTHER MOTOR.

No. 322,422. Patented July 21, 1885.

Witnesses.
Fred L. Emery.
John F. C. Prentlert.

Inventors.
Charles W. Collyer and
William C. Collyer.
by Crosby & Gregory attys

UNITED STATES PATENT OFFICE.

CHARLES W. COLLYER AND WILLIAM C. COLLYER, OF LYNN, MASSACHUSETTS, ASSIGNORS OF ONE-HALF TO PAIGE B. BALL AND GEORGE JENKINS, OF SAME PLACE.

SEWING-MACHINE OR OTHER MOTOR.

SPECIFICATION forming part of Letters Patent No. 322,422, dated July 21, 1885.

Application filed June 1, 1885. (No model.)

*To all whom it may concern:*

Be it known that we, CHARLES W. COLLYER and WILLIAM C. COLLYER, of Lynn, county of Essex, State of Massachusetts, have invented an Improvement in Sewing-Machine and other Motors, of which the following description, in connection with the accompanying drawings, is a specification, like letters on the drawings representing like parts.

This invention has for its object to improve the construction of motors whereby the speed of the machine may be made more uniform, and whereby the desired rate of speed may be established. In motors now in use wherein the pulley driving the belt on the belt-wheel of the sewing-machine is driven by friction of the said pulley against a disk fast on a driving-shaft actuated from a counter-shaft, the pressure of the pulley, loose on the driving-shaft, against the rotating disk fast on the said shaft is regulated by a lever under control of a treadle, the operator holding the treadle by her foot. The speed at which the sewing-machine shaft is run depends upon the force with which the said pulley is pressed against the said disk or on the amount of slip permitted between them, and if the force is variable the speed of the machine is also variable. In practice the pressure of the foot is found to be very unreliable to establish the speed and continue uniform speed by maintaining a certain uniform pressure; and, further, the act of pressing the treadle to keep the friction in action is very tiresome to the operator. To obviate the difficulties referred to, and in accordance with the invention herein contained, a device has been provided which acts as an adjustable treadle-holding stop, under which the end of the treadle, when depressed or moved to apply the friction, may be caught and held instead of being held by the foot.

Figure 1:
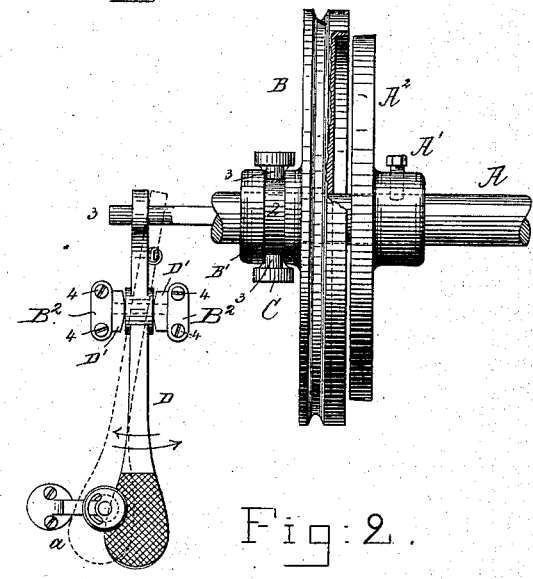
Figure 2:
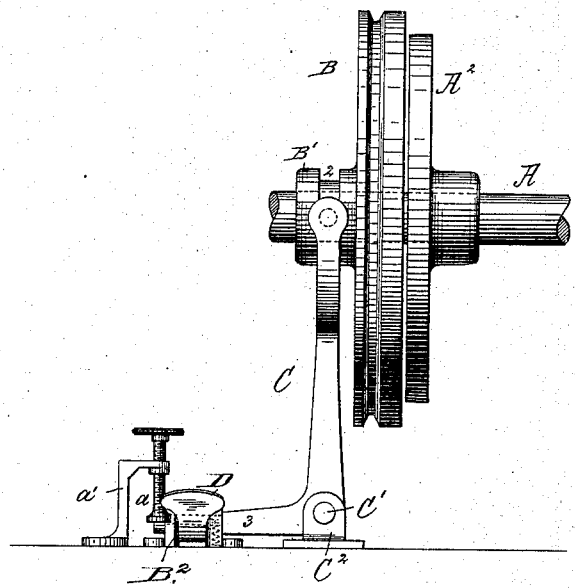

Figure 1 in top view represents a sufficient portion of a motor to illustrate the invention herein contained, and Fig. 2 is a front elevation of Fig. 1.

Referring to the drawings, A represents a shaft driven from any suitable counter-shaft and supposed to be extended under a table or bench upon which is supported the sewing-machine to be driven or it may be a series of such or other machines. The shaft A has attached to it by screw A' a disk, A², the latter being rotated continuously by the shaft and being used to carry with it the belt-pulley B, when one side of the latter is pressed against the said rotating disk, the speed of the belt-pulley B, with relation to the speed of the disk, depending upon the degree of friction exerted between them, or upon the amount of lost motion or speed between the belt-pulley and disk. The belt-pulley B, having the groove to receive the belt which is extended over the usual belt-wheel on the main shaft of the sewing or other machine to be driven by it, is mounted loosely upon the shaft A, and is free to be moved thereon to a limited extent longitudinally. The hub B' of the belt-pulley B has an annular groove, 2, which receives the pins or projections 3, carried by the lever C, the upper end of which is forked, as shown in the drawings, to embrace the said hub, the said lever being herein shown as an elbow-lever having its fulcrum at C' in a stand, C², attached to the floor. The arm 3 of the lever C is embraced by the forked end of the treadle D, having its fulcrum on a pin shown by dotted lines, the said pin being extended through or held by the ears of a stand, B², attached to the floor, as herein shown, by screws 4, provision being made between the said ears and the hub of the treadle B (see Fig. 1) to permit movement of the treadle laterally or in the direction of the arrows thereon, as well as to move vertically on the said pin as a fulcrum as an ordinary treadle. Depression of the outer end of the lever D causes the lever C to be turned in such direction as to force the inner side or face of the belt-pulley B' against the disk A², and as soon as the friction between the two is sufficient to move and counterbalance the power required to turn the belt-pulley B and the machine to be driven by it then the rotation of the belt-pulley commences, uniformity of speed of the belt-pulley and the approximation of its speed of rotation to that of the disk A² thereafter depending upon the continuity as well as the degree of pressure exerted upon the lever D.

To relieve the operator from holding the treadle D in one exact position in order to secure a definite speed, an adjustable stop, *a*, has been provided, the said stop being herein shown as a screw mounted in a bracket, *a'*, secured to the floor. The treadle when depressed is swung around underneath the stop, as shown in dotted lines, Fig. 1, it being retained just in the position required until it is desired to stop the belt-pulley, at which time operator has only by her foot to move the treadle laterally out from under the stop. This stop is made vertically adjustable, in order that the treadle may be held in a more or less depressed condition, according to the particular work being done, and to enable the motor to be adapted to operate sewing or other machines at the required speed, notwithstanding variations in the speed of the shaft A, which variations frequently occur by reason of the amount of work being done—as, for instance, whether or not the shaft drives one or fifty machines.

It is obvious from the foregoing that the particular shape of the lever to move the belt-pulley, and the particular shape of the face of the belt-pulley where it co-operates with the disk $A^2$ to form a friction or clutch pulley, need not necessarily be just as herein shown, but may be of other well-known equivalent construction.

We claim—

1. In a motor device, a rotating shaft, an attached disk, a belt-pulley on the said shaft, and a lever to operate the belt-pulley to engage the disk, combined with a treadle, and the stop to hold the same depressed, substantially as described.

2. In a motor device, a rotating shaft, an attached disk, a belt-pulley on the said shaft, and a lever to operate the belt-pulley to engage the disk, combined with a treadle and an adjustable stop to hold the same depressed, substantially as described.

In testimony whereof we have signed our names to this specification in the presence of two subscribing witnesses.

CHARLES W. COLLYER.
WILLIAM C. COLLYER.

Witnesses:
GEORGE JENKINS,
BENJ. M. CLIFFORD.